UNITED STATES PATENT OFFICE.

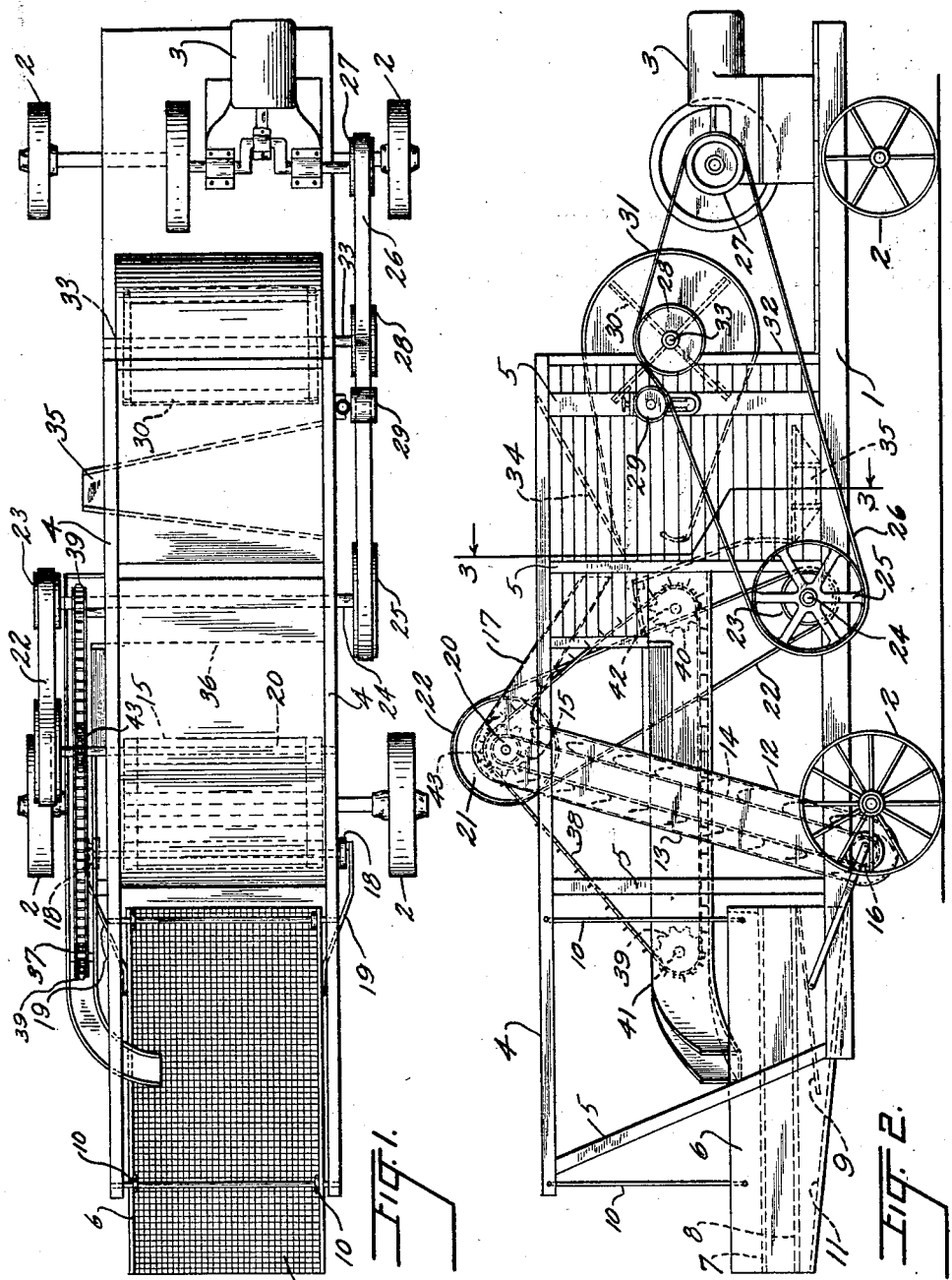

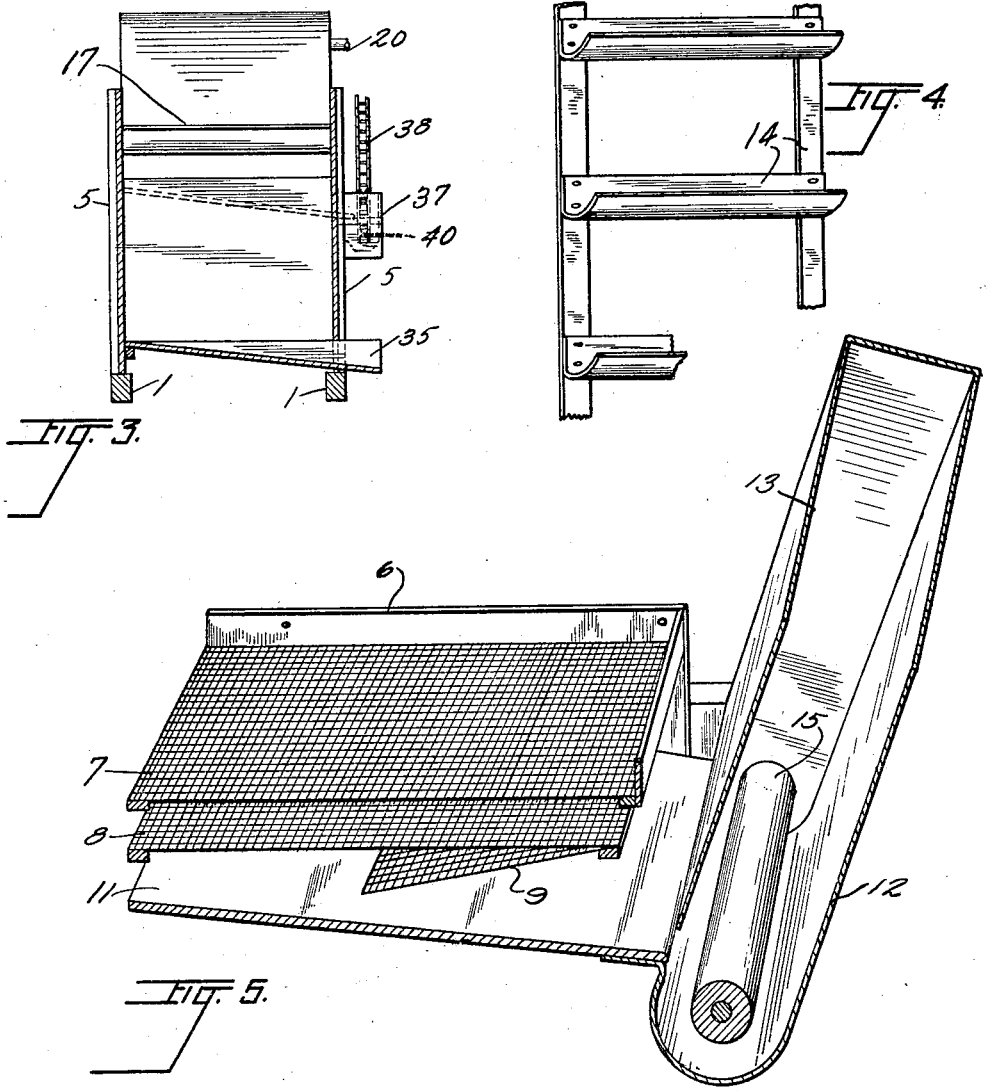

JOHN DAVID CARLSON, OF TURLOCK, CALIFORNIA.

BEAN-CLEANER.

1,275,385.

Specification of Letters Patent.

Patented Aug. 13, 1918.

Application filed November 5, 1917. Serial No. 200,352.

*To all whom it may concern:*

Be it known that I, JOHN D. CARLSON, residing at Turlock, in the county of Stanislaus and State of California, have invented certain new and useful Improvements in Bean-Cleaners, of which the following is a specification.

This invention relates to improvements in bean cleaners and its object is to produce a machine of this type that is very efficient in operation. Means are provided for first screening the beans and separating some of the dirt and chaff therefrom and then subjecting the beans to the action of a rotary fan whereby they are further cleaned before they are passed from the machine. Such beans as may be blown out of their intended course by the action of the fan are automatically returned to the starting screens and run over the course a second time thus subjecting them to a second cleaning. More specifically the invention consists in the combination and arrangement of parts to be hereinafter fully described, pointed out in the appended claims and illustrated in the accompanying drawings which form a part of this specification and in which—

Figure 1 is a plan view of my improved bean cleaning machine.

Fig. 2 is a view of the same in side elevation.

Fig. 3 is a cross section taken on line 3—3 of Fig. 2.

Fig. 4 is an enlarged fragmentary view of one form of conveyer employed.

Fig. 5 is an enlarged fragmentary view, in perspective, of the screens and the conveyer housing showing the opening in the bottom of the conveyer housing to permit passage of the beans.

Like reference characters denote corresponding parts throughout the several views.

My machine comprises the frame 1 carried upon wheels 2 and provided with the engine 3. Top beams 4 are supported upon the supports 5 carried by the frame 1 and a screen frame 6 provided with screens 7, 8, 9 is supported by the rods 10 to swing from said top beams. An inclined floor 11 is projected from the conveyer housing 12 beneath the screens 7, 8, 9, said screens and their frame 6 being movable with relation to said floor 11. One wall 13 of the conveyer housing is spaced away, at its lower end, from the said floor 11 to permit the beans from said floor to pass therebeneath and into the conveyer housing where they are picked up by the conveyer 14, arranged upon terminal rollers 15, 16, and carried to the top of the conveyer housing and discharged through the conveyer chute 17. Disks 18 arranged upon opposite ends of the shafts of the conveyer rollers are connected, off center, by the rods 19 with the said screen frame 6 whereby a reciprocating motion is imparted to the same. The shaft 20 of conveyer roller 16 is projected beyond that roller and provided terminally with a pulley 21 which is connected by a belt 22 with a pulley 23 arranged upon a transmission shaft 24 which shaft is provided, further, with a pulley 25 over which the belt 26 runs to the engine pulley 27, said belt 26 passing over the fan pulley 28 with which it is retained in operative engagement by means of the tension pulley 29 operatively carried by one of the supports 5. The beans discharged from the conveyer chute 17 pass in front of the fan 30 arranged in the fan housing 31 suitably carried by uprights 32 which in turn are carried by the frame 1, said fan being arranged upon a fan shaft 33 journaled in the sides of the fan housing, said fan shaft also carrying the fan pulley aforesaid.

The fan will further clean the beans, the majority of which will now pass into the hopper 34 and out through the chute 35 into any receptacle provided therefor. Certain small beans, chaff, straw and the like will be blown by the fan into a return chute 36 which is inclined to discharge its contents into the trough 37 which leads back to the screens 7, 8, 9. A return conveyer 38 passes over sprockets 39, 40 fast upon shafts 41, 42 journaled in the sides of the trough 37, said return conveyer passing over and being driven by a sprocket 43 fast upon the said shaft 20. The return conveyer in operation sweeps the floor of the trough 37 and propels such beans, chaff and straw as fall into that trough through the same to the screens again from which the beans will again traverse the route described and finally be passed out through the said chute 35.

What is claimed is:—

1. In a cleaner, superimposed shaking screens, a conveyer housing contiguous to said shaking screens, a floor arranged beneath said shaking screens and communicating with said conveyer housing and spaced away from the adjacent wall thereof, a conveyer within said housing, a conveyer chute, a fan contiguous to the mouth of said conveyer chute, a trough contiguous to said fan and communicating with said superimposed screens, and a return conveyer operative in said trough.

2. In a cleaner, superimposed shaking screens, a conveyer housing contiguous to said shaking screens, a stationary floor arranged beneath said shaking screens and communicating with said conveyer housing and spaced away from the adjacent wall thereof, a conveyer within said housing, a conveyer chute, a fan contiguous to the mouth of said conveyer chute, a trough contiguous to said fan and communicating with said superimposed screens, and means operative in said trough whereby the contents thereof may be advanced therethrough in the direction of the said superimposed screens.

3. In a cleaner, superimposed shaking screens, a conveyer housing contiguous to said shaking screens, a stationary floor arranged beneath said shaking screens and communicating with said conveyer housing and spaced away from the adjacent wall thereof, a conveyer within said housing, a conveyer chute, a fan contiguous to the mouth of said conveyer chute, and bean-receiving and transporting means contiguous to said fan and communicating with the said superimposed screens.

In testimony that I claim the foregoing as my own I have hereto affixed my signature in the presence of two subscribing witnesses.

JOHN DAVID CARLSON.

Witnesses:
WM. N. GRAYBIEL,
LOIS M. STEELE.